Aug. 28, 1923.
F. A. CARPENTER
RECORDING INSTRUMENT
Filed Oct. 26, 1921
1,466,271
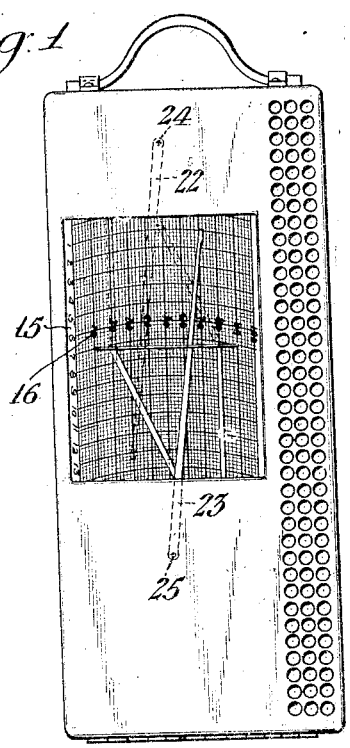
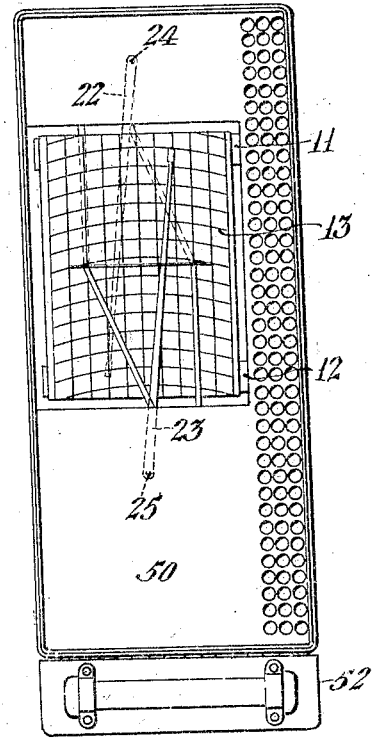
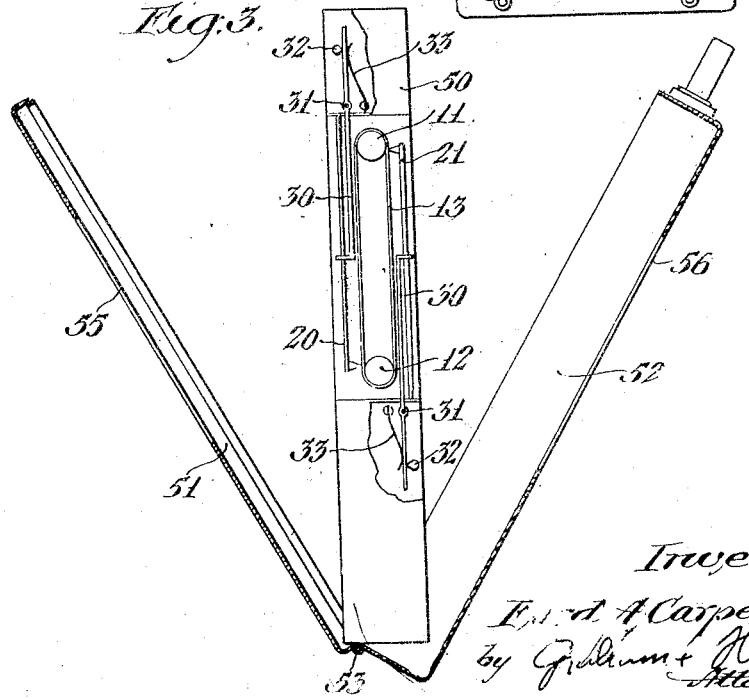
Inventor
F. A. Carpenter
by Graham + Hann
Attorneys Patented Aug. 28, 1923.

1,466,271

UNITED STATES PATENT OFFICE.

FORD A. CARPENTER, OF LOS ANGELES, CALIFORNIA.

RECORDING INSTRUMENT.

Application filed October 26, 1921. Serial No. 510,550.

*To all whom it may concern:*

Be it known that I, FORD A. CARPENTER, a citizen of the United States, residing at Los Angeles, in the county of Los Angeles and State of California, have invented a new and useful Improvement in Recording Instruments, of which the following is a specification.

My invention relates to recording instruments and is particularly applicable to instruments adapted to register temperature and humidity, or temperature and altitude, or any two or more variable conditions.

A further object of my invention is to provide an instrument which will be compact and which will record in convenient form two or more sets of conditions over a considerable period.

A further object of my invention is to provide an instrument which will produce a record of two or more conditions, which can be readily interpreted and which can be inspected at any time during the recording.

Further objects and advantages will be made evident hereinafter.

Referring to the drawings which are for illustrative purposes only:

Fig. 1 is a side elevation of one embodiment of my invention, with the case closed.

Fig. 2 is a similar view with the case open.

Fig. 3 is an end view partially in section showing the method in which the case opens.

In the form of my invention shown, two rollers 11 and 12 are pivoted in suitable structure, one or more of these rollers being driven from a clock mechanism, not shown. Passing around these rollers is a record 13 which consists of a continuous band of paper marked longitudinally with ordinates 15, the spaces between the ordinates representing time, and with abscissas 16 the intervals between the abscissas representing temperature, humidity, altitude or the like.

For the purpose of recording I provide two recording members 20 and 21, which may be pens, holding a supply of ink sufficient for a considerable period. These pens are carried on arms 22 and 23, pivoted at 24 and 25, and actuated by thermometer, hygrometer or barometer elements of any well known form. The method of applying such elements to moving pointers is well known in the art and will not be described.

It will be noted that the two arms 22 and 23 are at opposite sides of the rollers 11 and 12, and that they press upon points on the paper which would be diametrically opposite to each other if the paper were removed and expanded to a cylindrical form. This paper can be conveniently operated at such a speed that there is a complete rotation thereof in 24 hours, in which case the two pens record, simultaneously, on lines which are 12 hours apart, that is, one pen is at 2 a. m. when the other pen is at 2 p. m. on the paper. It is quite essential to the reading of the record that these pens be so spaced that the time interval between them is accurate and preferably an even number of time divisions.

For the purpose of improving the record, I provide arms 30, pivoted at 31, and actuated by cams 32 driven by the driving mechanism and acting against flat springs 33. These arms 30 are utilized to lift the pens 20 and 22 from the paper at periodic and frequent intervals, so as to produce a dotted record which is quicker drying and much less likely to smear than a continuous one.

I mount my complete structure inside an inner case 50, having a shallow cover 51, and a deep cover 52, each pivoted on a hinge 53. I provide in the cover 51 a transparent window 55, and in the cover 52 a transparent window 56, through which the records can be observed at any time.

The form of my invention has a special utility in that it is flat and substantially rectangular, so that it can be readily packed and transported. It is also arranged that practically the entire record can be observed through the windows 55 and 56. It is particularly suited for use in recording data in connection with aeroplane or balloon flights and finds a considerable application in the arts, being used to record temperature and humidity, or other facts, in connection with industrial processes.

I claim as my invention:

1. A device for graphically recording the variations in two or more variables comprising: a sheet of paper having ordinates representing time and abscissas representing values of said variables; two rollers having parallel axes around which said paper is passed the ends of said paper being joined to form a continuous band; means for driving said paper at a uniform speed; a recording member pressing on said paper;

mechanism for moving said recording member along an abscissa through a distance equal to the momentary magnitude of one of said variables; a second recording member pressing on said paper; and mechanism for moving said recording member along an abscissa through a distance equal to the momentary magnitude of another variable, said two recording members being so adjusted that at any moment they rest upon two different abscissas, one of which is upon that portion of the paper lying at one side of said rollers and the other of which is upon that portion of the paper lying on the other side of said rollers.

2. A device for graphically recording the variations in two or more variables comprising; a sheet of paper having ordinates representing time and abscissas representing values of said variables; two rollers having parallel axes around which said paper is passed the ends of said paper being joined to form a continuous band; means for driving said paper at a uniform speed; a recording member pressing on said paper; mechanism for moving said recording member along an abscissa through a distance equal to the momentary magnitude of one of said variables; a second recording member pressing on said paper; and mechanism for moving said recording member along an abscissa through a distance equal to the momentary magnitude of another variable, said two recording members being so adjusted that at any moment they rest upon two different abscissas, one of which is upon that portion of the paper lying at one side of said rollers and the other of which is upon that portion of the paper lying on the other side of said rollers.

3. A device for graphically recording the variations in two or more variables comprising: a sheet of paper having ordinates representing time and abscissas representing values of said variables; two rollers having parallel axes around which said paper is passed the ends of said paper being joined to form a continuous band; means for driving said paper at a uniform speed; a recording member pressing on said paper; means for periodically lifting said recording means from said paper to produce a broken record; mechanism for moving said recording member along an abscissa through a distance equal to the momentary magnitude of one of said variables; a second recording member pressing on said paper; and mechanism for moving said recording member along an abscissa through a distance equal to the momentary magnitude of another variable, said two recording members being so adjusted that at any moment they rest upon two different abscissas, one of which is upon that portion of the paper lying at one side of said rollers and the other of which is upon that portion of the paper lying on the other side of said rollers.

4. In a recording instrument, the combination of: a flat case having openings on either side thereof; two rollers in said case, one on one side of said openings and the other on the other side of said openings; a strip of paper passing around said rollers and presenting a flat surface in front of each of said openings; and recording means for marking a record on said strip in such manner that said record is visible through said openings.

5. In a recording instrument, the combination of: a flat case having openings on either side thereof; two rollers in said case, one on one side of said openings and the other on the other side of said openings; a strip of paper passing around said rollers and presenting a flat surface in front of each of said openings; and two recording means, one bearing and marking on that portion of the paper strip visible through one opening and the other bearing and marking on that portion of the paper strip visible through the other opening.

In testimony whereof, I have hereunto set my hand at Los Angeles, California, this 20th day of October, 1921.

FORD A. CARPENTER.